US007859215B2

(12) United States Patent
Nagai et al.

(10) Patent No.: US 7,859,215 B2
(45) Date of Patent: Dec. 28, 2010

(54) MOTOR CONTROLLER, CONTROL SYSTEM, AND CONTROL METHOD

(75) Inventors: Kazunobu Nagai, Yokohama (JP); Sari Maekawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 387 days.

(21) Appl. No.: 12/053,823

(22) Filed: Mar. 24, 2008

(65) Prior Publication Data
US 2009/0085508 A1 Apr. 2, 2009

(30) Foreign Application Priority Data
Sep. 28, 2007 (JP) ............................. 2007-254002

(51) Int. Cl.
*G05B 19/31* (2006.01)
(52) U.S. Cl. .................. 318/605; 318/661; 318/400.04; 318/400.39; 318/599
(58) Field of Classification Search ................ 318/560, 318/602, 605, 660, 661, 678, 127, 154, 700, 318/400.04, 400.05, 400.14, 400.39, 721, 318/801, 437, 400.01, 490, 599, 628, 636, 318/811, 823; 341/126
See application file for complete search history.

(56) References Cited
U.S. PATENT DOCUMENTS

| | | | | |
|---|---|---|---|---|
| 5,189,353 A * | 2/1993 | Ezuka | ......................... | 318/605 |
| 5,455,498 A * | 10/1995 | Kakimoto et al. | ........... | 318/605 |
| 6,278,388 B1 * | 8/2001 | Kushihara | ................... | 341/112 |
| 6,389,373 B1 * | 5/2002 | Ohya | ......................... | 702/189 |
| 6,931,918 B2 * | 8/2005 | Herb | ....................... | 73/114.26 |
| 6,948,382 B2 * | 9/2005 | Sakai et al. | ............ | 73/862.326 |
| 6,972,700 B2 * | 12/2005 | Kanekawa et al. | .......... | 341/116 |
| 7,009,535 B2 * | 3/2006 | Kanekawa et al. | .......... | 341/116 |
| 7,047,145 B2 * | 5/2006 | Ishizuka et al. | ............... | 702/94 |
| 7,135,860 B2 * | 11/2006 | Miya et al. | ............. | 324/207.25 |
| 7,154,404 B2 * | 12/2006 | Sato | ...................... | 318/400.21 |
| 7,157,906 B2 * | 1/2007 | Miya | ..................... | 324/207.25 |
| 7,298,109 B2 * | 11/2007 | Sakamaki et al. | ........... | 318/489 |
| 7,301,333 B2 * | 11/2007 | Kuwahara | .............. | 324/207.25 |
| 7,343,254 B2 * | 3/2008 | Otsuka et al. | ................. | 702/58 |
| 7,664,619 B2 * | 2/2010 | Kameya et al. | ............. | 702/183 |

FOREIGN PATENT DOCUMENTS
JP 2005-210839 A 8/2005

* cited by examiner

*Primary Examiner*—Bentsu Ro
*Assistant Examiner*—Anthony M Paul
(74) *Attorney, Agent, or Firm*—Pearne & Gordon LLP

(57) ABSTRACT

A motor controller includes a reference signal generator; an A/D converter performing A/D conversion of the cosine and the sine signals outputted from a resolver; a first amplitude calculator calculating cosine and sine signal amplitudes based on twice-A/D converted cosine and sine signals respectively; a second amplitude calculator calculating averages of the cosine and the sine signals, and that calculates the amplitude of the cosine signal from a difference between the cosine signal average and a latest A/D converted cosine signal, and that calculates the amplitude of the sine signal from a difference between the sine signal average and a latest A/D converted sine signal; a synthesizer synthesizing the cosine and sine signal amplitudes obtained by the first and the second amplitude calculators respectively; a rotational angle calculator calculating a rotational angle based on the synthesized cosine and sine signal amplitudes; and a PWM controller.

10 Claims, 10 Drawing Sheets

FIG. 6A TRIANGULAR WAVE
FIG. 6B COSINE SIGNAL S3
FIG. 6C SINE SIGNAL S4
FIG. 6D A/D CONVERSION TIMING
FIG. 6E COSINE DATA Dc
COSINE AMPLITUDE Lc2/2
COSINE AVERAGE Nc
FIG. 6F SINE DATA Ds
SINE AMPLITUDE Ls2/2
SINE AVERAGE Ns

MOTOR CONTROLLER, CONTROL SYSTEM, AND CONTROL METHOD

CROSS-REFERENCE TO RELATED APPLICATIONS

This application is based upon and claims the benefit of priority from the prior Japanese Patent Application 2007-254002, filed on, Sep. 28, 2007 the entire contents of which are incorporated herein by reference.

FIELD

The present disclosure relates to a motor controller that detects motor rotational angle based on output signal produced by a resolver and that performs PWM (Pulse Width Modulation) control of current flow in motor windings.

BACKGROUND

Motor controllers that control motor current phase generally require a rotational angle detector for detecting motor rotational angle to optimize the current phase. A rotational angle detector is generally implemented by a hall IC. However, a resolver, providing higher angular encodability, is a better alternative when required to restrain torque variation occurring in a single motor rotation as much as possible or when controlling the stop position of the motor. The use of resolver requires a converter for obtaining rotational angle from the output signal produced by the resolver. One example of a well known converter is a dedicated resolver/digital converter IC ("AU6802" manufactured by Tamagawa Seiki Co., Ltd., for example).

JP 2005-210839 A discloses a configuration that detects motor rotational angle without using a dedicated IC in order to reduce cost. FIG. 10 accompanying the present disclosure illustrates the configuration described in the above described reference. As can be seen in FIG. 10, a resolver 2 is provided in a motor 1. A controller 3 that controls the drive of motor 1 is configured by a microcomputer 4, a drive circuit 5, an inverter main circuit 6, a current detecting circuit 7, a synchronous excitation signal generator 8, an amplifier 9, and a differential amplifier 10. Current detector 7 detects current flowing in the windings of motor 1. Microcomputer 4 is provided with an A/D converter 12a that performs A/D conversion of current detection signals.

Microcomputer 4 is also provided with a PWM circuit 11 for outputting clock signal S1 synchronized with a carrier wave period for PWM modulation. The clock signal S1 provides basis for generating sinusoidal excitation signal S2 at synchronous excitation signal generating circuit 8. The excitation signal S2 is amplified at the amplifier 9 to be applied to the resolver 2 thereafter.

The resolver 2 outputs cosine signal S3 and sine signal S4 which are then amplified at differential amplifier 10 to be thereafter A/D converted at A/D converter 12b of the microcomputer 4 so as to be synchronized with the carrier wave period. The microcomputer 4 obtains cosine data Dx and sine data Dy from the difference between the latest data and the previous data for the cosine signal S3 and sine signal S4 and thereafter executes function arctan to calculate rotational angle θ of the rotor.

The above described rotational angle detector reduces cost since it eliminates the need for a dedicated resolver/digital conversion IC. Further, since calculation is performed depending on the difference of discretely inputted data, the effect of temperature drift occurring on output signals S3 and S4 of the resolver 2 and temperature drift occurring at differential amplifier 10 and A/D converter 12b are advantageously eliminated.

However, the above described rotational angle detector uses the latest data of the current iteration and the previous data of the preceding iteration that are inputted discretely. Thus, when time differences between the inputs are not small enough, in other words, when the carrier wave period and A/D conversion period are not small enough relative to the rotational period of the motor, meaning that the motor is in high-speed motor rotation, calculation errors occur that prevent acquisition of accurate rotational angle.

SUMMARY

The present disclosure provides a motor controller, a motor control system and a motor control method that are low cost and that allow efficient operation by accurate detection of rotational angle during low-speed rotation and during high-speed rotation as well.

The present disclosure discloses a controller for a motor provided with a resolver that outputs a cosine signal and a sine signal, the controller including; a reference signal generator that generates a reference excitation signal synchronized with a PWM (Pulse Width Modulation) period and that provides the reference excitation signal to the resolver; an A/D converter that performs A/D conversion of the cosine signal and the sine signal outputted from the resolver, the A/D conversion being synchronized with the PWM period; a first amplitude calculator that calculates an amplitude of the cosine signal of the resolver based on a twice-A/D converted cosine signal and that calculates an amplitude of the sine signal of the resolver based on a twice-A/D converted sine signal; a second amplitude calculator that calculates averages of the cosine signal and the sine signal of the resolver based on their past A/D converted values, and that calculates the amplitude of the cosine signal of the resolver from a difference between the cosine signal average and a latest A/D converted cosine signal, and that calculates the amplitude of the sine signal of the resolver from a difference between the sine signal average and a latest A/D converted of the sine signal; a synthesizer that synthesizes the cosine and sine signal amplitudes of the resolver obtained by the first amplitude calculator and the cosine and sine signal amplitudes of the resolver obtained by the second amplitude calculator; a rotational angle calculator that calculates a rotational angle of the motor based on the synthesized cosine and sine signal amplitudes of the resolver outputted by the synthesizer; a PWM controller that performs PWM control of motor winding current based on the rotational angle calculated by the rotational angle calculator.

When the amplitude calculated by the first amplitude calculator is used, accurate rotational angle can be obtained which is free from being affected by drifts occurring at the resolver and the controller. When the amplitude calculated by the second amplitude calculator is used, accurate rotational angle can be obtained which is free from being affected by errors dependent on the period of amplitude calculation. Thus, by synthesizing the two amplitudes, accurate rotational angle having reduced magnitude of error originating from both drift and processing period can be obtained. Hence, the present disclosure allows acquisition of accurate rotational angle throughout the entire rotational range used and efficient control of the motor.

BRIEF DESCRIPTION OF THE DRAWINGS

Other objects, features and advantages of the present disclosure will become clear upon reviewing the following description of the exemplary embodiments with reference to the accompanying drawings, in which.

DETAILED DESCRIPTION

A description will be given hereinafter on a first exemplary embodiment with reference to the drawings.

Figure 1A:
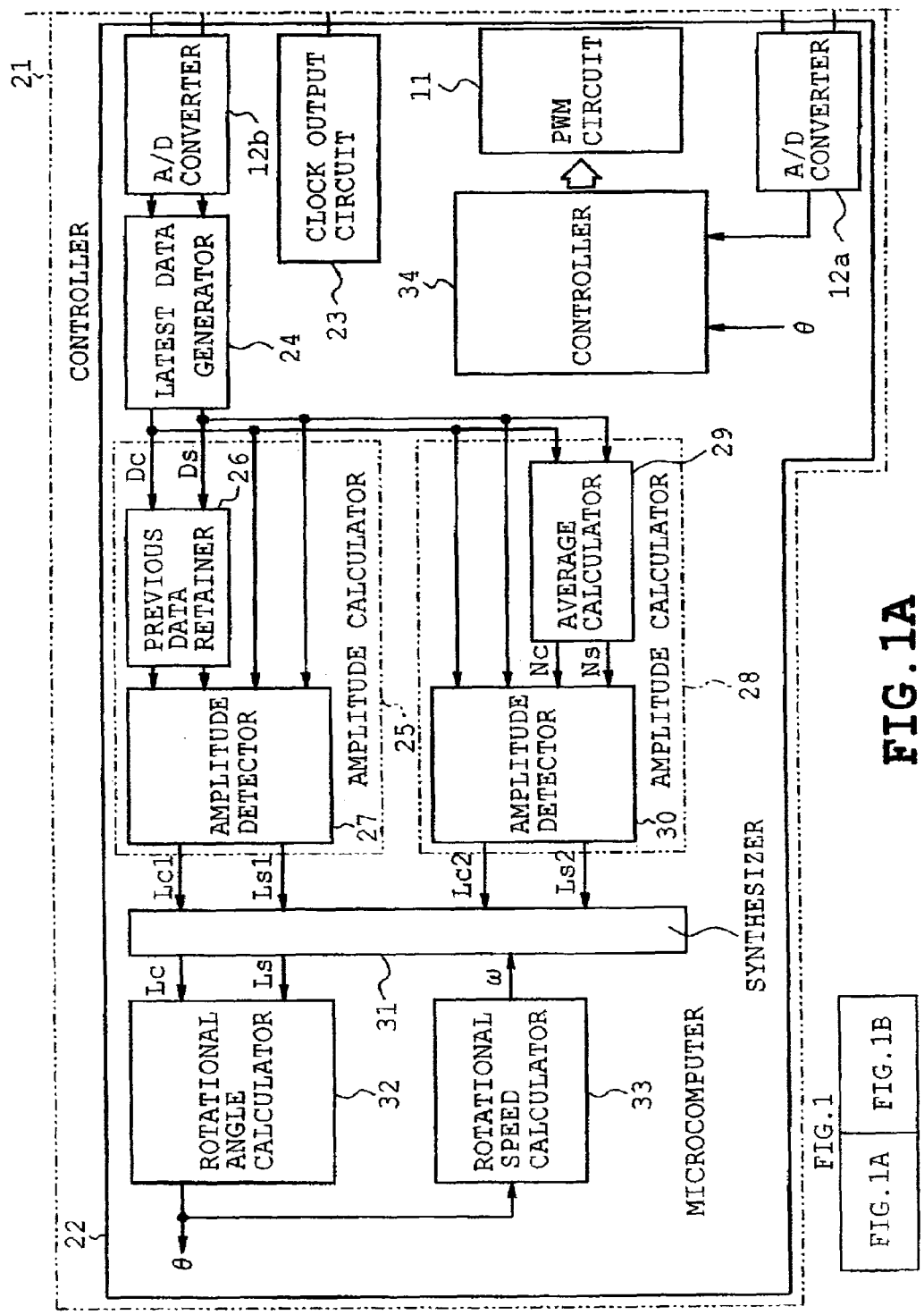
FIGS. 1A and 1B shows a system configuration of a motor controller according to a first exemplary embodiment of the present disclosure.
Figure 1B:
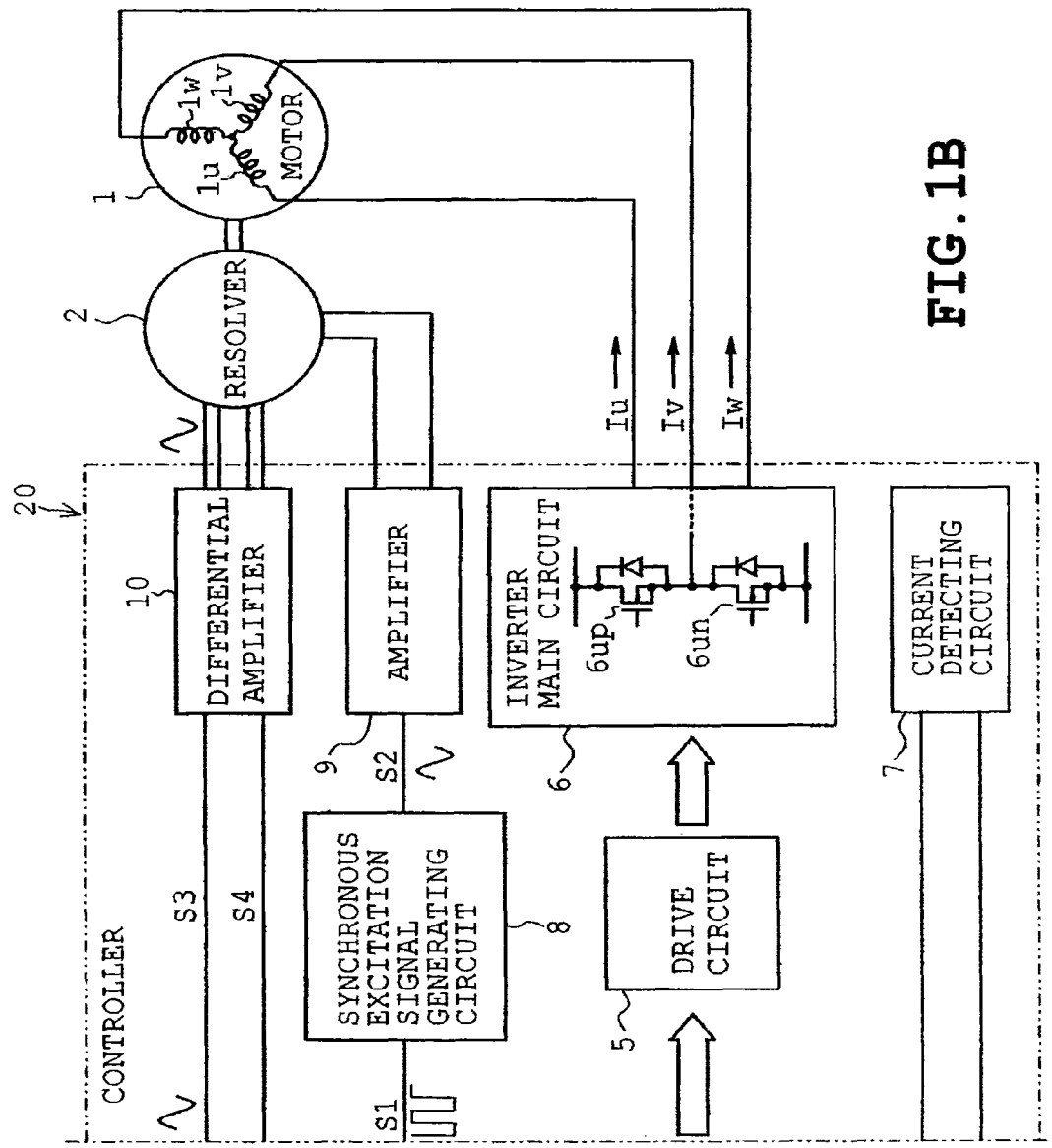
Figure 10:
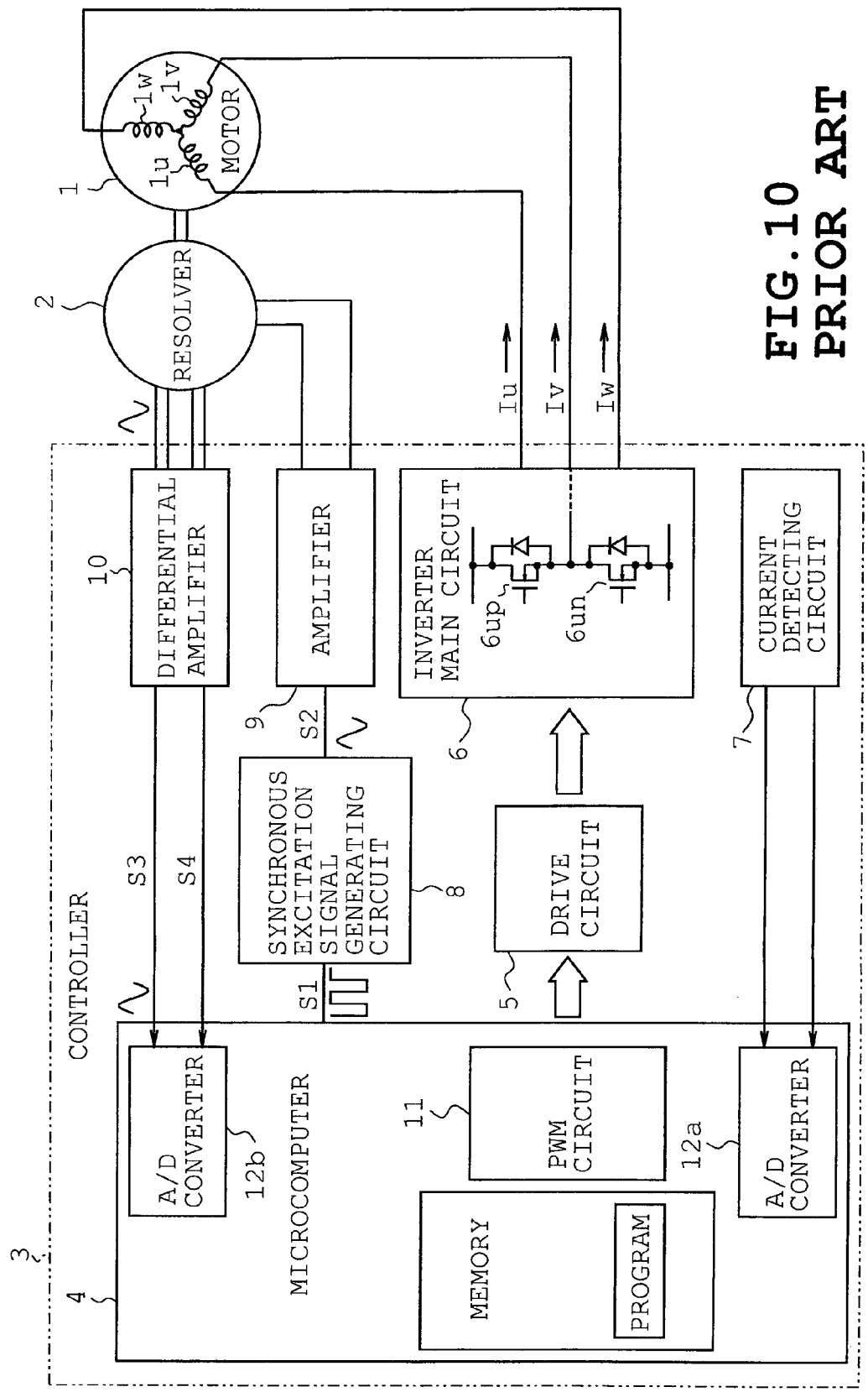
FIG. 10 shows a system configuration of a motor control system according to conventional art.

FIGS. 1A and 1B describe the configuration of a motor control system. The components that are identical to the corresponding components in FIG. 10 are represented by identical reference symbols. A motor control system 20 is suitable for controlling motors and power generators of hybrid vehicles. A controller 21 detects rotational angle θ of a brushless DC motor 1 based on cosine signal S3 and sine signal S4 outputted from the resolver 2 to execute PWM control of currents Iu, Iv, and Iw flowing in windings lu, lv, and lw of motor 1.

The controller 21 is configured by a microcomputer 22, a drive circuit 5, an inverter main circuit 6, a current detecting circuit 7, a synchronous excitation signal generating circuit 8, an amplifier 9, and a differential amplifier 10. At microcomputer 22, the CPU reads control programs stored in the memory to execute later described processes such as A/D conversion, amplitude calculation, selective synthesis, rotational angle calculation, and PWM current control.

Current detector 7 is configured by shunt resistances, for example, inserted between the lower arm of the inverter main circuit 6 and the ground. Microcomputer 22 detects currents Iu, Iv, and Iw flowing in motor 1 by input of terminal-to-terminal voltage of the shunt resistances via an A/D converter 12a configured in the microcomputer 22.

The inverter main circuit 6 is an inverter having six switching elements such as MOSFET $6up$, $6un$, and so on constituting a three-arm bridge. A PMW circuit 11 of microcomputer 22 outputs six energizing signals for the three-phase upper and lower arms to the MOSFET $6up$, $6un$, and so on via drive circuit 5. PWM voltages are thus, applied on windings lu, lv, lw of motor 1.

Figure 2:
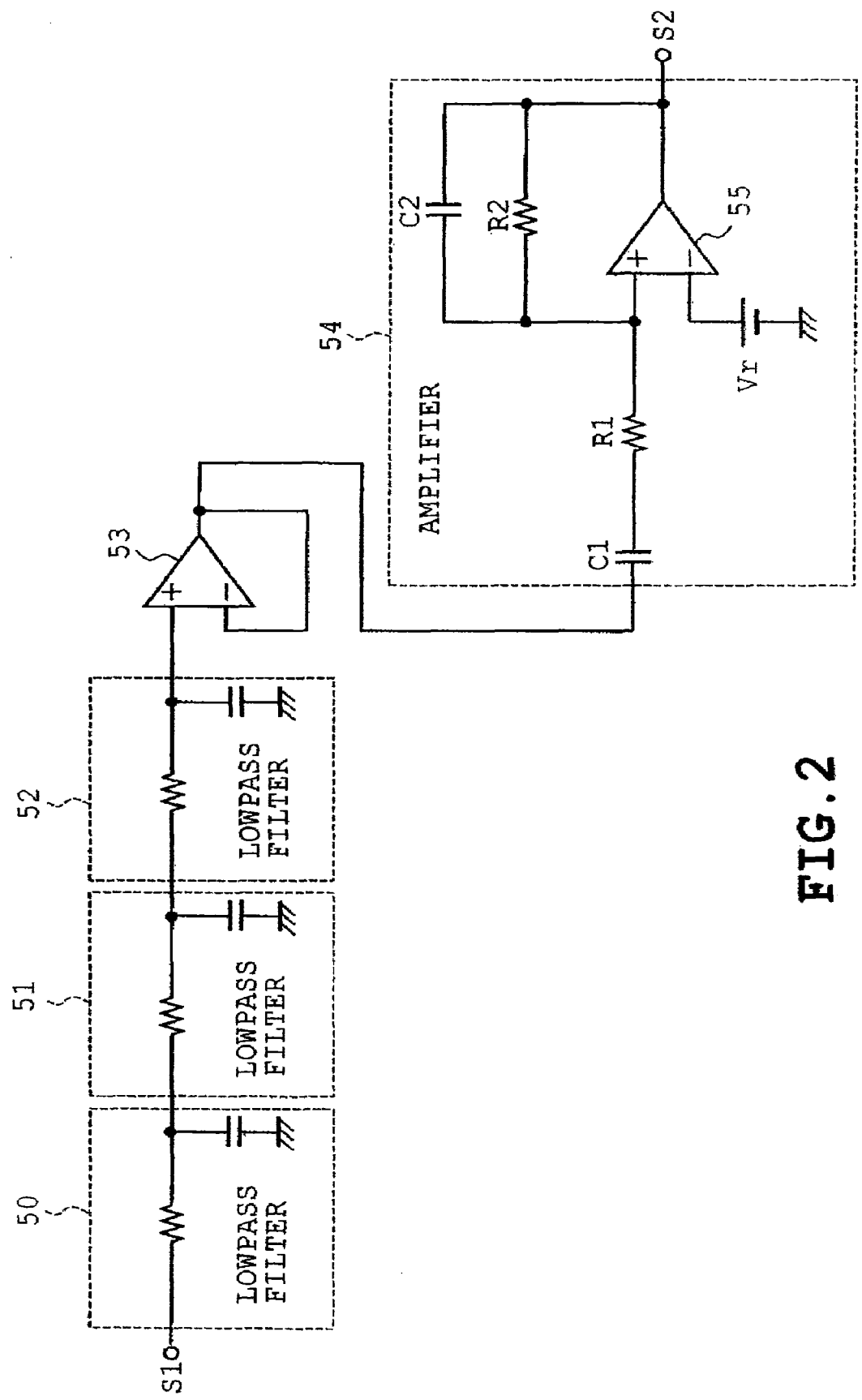
FIG. 2 shows a circuit configuration of a synchronous excitation signal generating circuit.

A clock output circuit 23 configured in microcomputer 22 outputs clock signal S1 synchronized with the current control process and a synchronous excitation signal generating circuit 8 serving as a reference signal generator performs low pass filtering of the clock signal S1 to generate excitation signal S2 synchronized with the PWM period. FIG. 2 shows the circuit configuration of synchronous excitation signal generating circuit 8. Clock signal S1 inputted to the circuit is passed through low pass filters 50, 51, and 52, each comprising a resistance and a condenser for removing harmonic component, then, to an operation amplifier 53 for buffering, and thereafter supplied to an amplifier 54. A condenser C1 is inserted at the amplifier 54 for removing direct current component with respect to standard voltage Vr. Further, resistances R1 and R2 and the condenser C2 provide adjustments in amplitude and phase of the excitation signal S2, which adjusted excitation signal S2 is thereafter outputted from the circuit.

The adjusted excitation signal S2 is amplified at the amplifier 9 and thereafter applied to the excitation coils of the resolver 2 mounted on the motor 1. The output coils of the resolver 2, namely the cosine coil and the sine coil output a cosine signal S3 and a sine signal S4, respectively. Cosine and sine signals S3 and S4 are then, amplified at the differential amplifier 10. The cosine and sine signals S3 and S4 outputted from the differential amplifier 10 are thereafter A/D converted at the A/D converter 12b provided in microcomputer 22. Then, a latest data generator 24 also provided in the microcomputer 22 generates digital cosine data Dc and sine data Ds based on the A/D converted cosine and sine signals S3 and S4.

Both cosine and sine data Dc and Ds are provided to a previous data retainer 26 and an amplitude detector 27 constituting a first amplitude calculator 25 and an average calculator 29 and an amplitude detector 30 constituting a second amplitude calculator 28, respectively.

The amplitude detector 27 of the first amplitude calculator 25 executes a first amplitude calculation process for obtaining amplitude Lc1 of the cosine signal S3 and amplitude Ls1 of the sine signal S4 based on cosine and sine data Dc and Ds corresponding to resulting values after two consecutive A/D conversions. The previous data retainer 26 is configured by storage devices such as memory or resistors and outputs cosine data Dcz and sine data Dsz which are delayed by rotational angle calculation period T from cosine and sine data Dc and Ds outputted from the latest data generator 24.

The second amplitude calculator 28 calculates average Nc of cosine signal S3 and average Ns of sine signal S4 based on past A/D converted values at the average calculator 29. Then, at the amplitude detector 30, a second amplitude calculation process is executed to obtain amplitude Lc2 of cosine signal S3 and amplitude Ls2 of sine signal S4 based on the difference between average Nc and latest data Dc and the difference between average Ns and latest data Ds, respectively.

Then, at synthesizer 31, amplitudes Lc1 and Ls1 obtained in the first amplitude calculation process and amplitudes Lc2 and Ls2 obtained in the second amplitude calculation process are selected and synthesized based on rotational speed ω provided by a rotational speed calculator 33 to obtain a cosine amplitude Lc and a sine amplitude Ls by a selective synthesizing process. The synthesized cosine amplitude Lc and sine amplitude Ls provide basis for execution of rotational angle calculation process for calculating rotational angle θ at a rotational angle calculator 32. The rotational speed calculator 33 calculates rotational speed ω based on rotational θ.

The obtained rotational angle θ is utilized in the field-oriented control of motor 1, in which microcomputer 22 executes a rotational speed control process for controlling q-axis current based on rotational speed error and a PWM current control, process for controlling d-axis and q-axis voltages based on d-axis and q-axis current errors at a controller 34 (PWM controller).

A description will now be given on the operation of the present exemplary embodiment.

Figure 4:
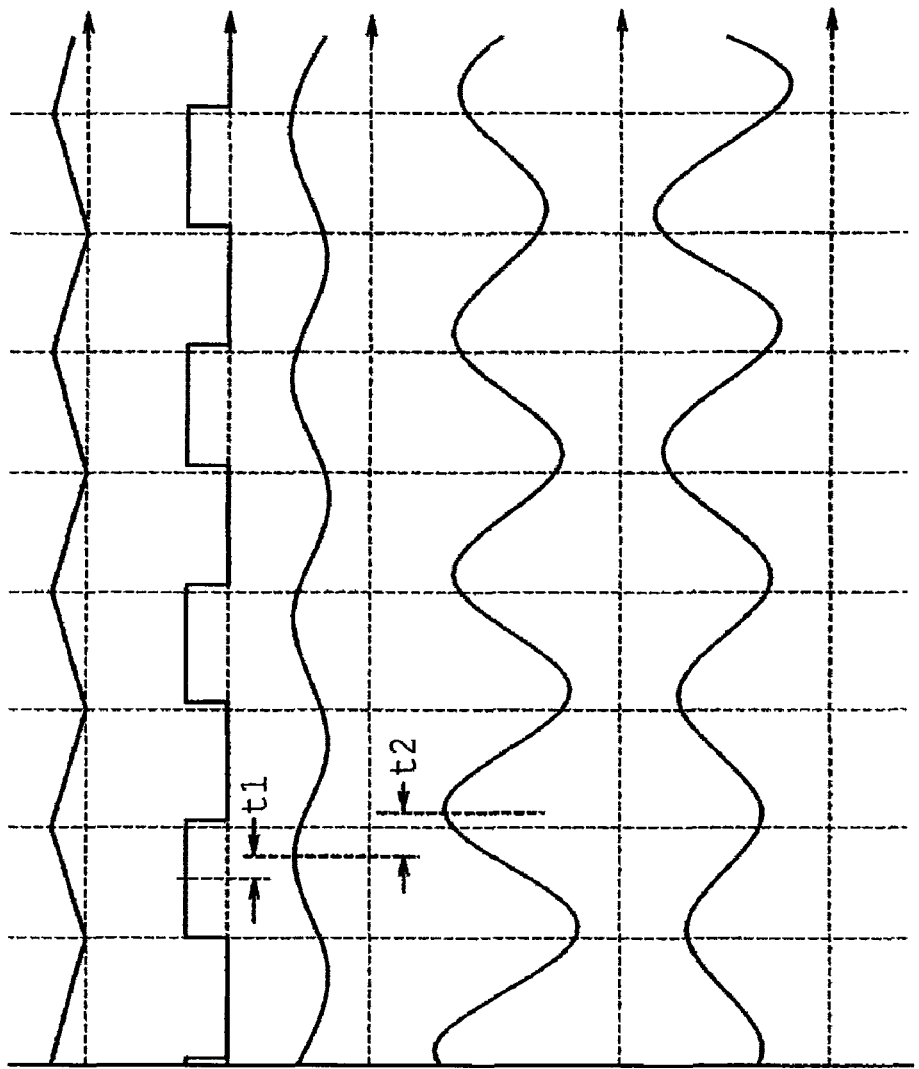
FIG. 4A to 4E shows waveforms of a triangular wave, a clock signal S1, an excitation signal S2, a cosine signal S3, and a sine signal S4.

FIG. 4 depicts the waveforms involved in the motor control, namely, a triangular wave representing a carrier wave, clock signal S1, excitation signal S2, cosine signal S3 and the sine signal S4. Clock output circuit 23 outputs clock signal S1 synchronized with and also assuming the same period as the triangular wave. Clock signal S1 taking a rectangular waveform is thereafter filtered by the synchronous excitation signal generating circuit 8 to remove harmonic component and direct current component to produce an output of excitation signal S2.

Excitation signal S2 is applied on the excitation coils of resolver 2 via amplifier 9. Cosine and sine signals S3 and S4 outputted from resolver 2 are provided to microcomputer 22 via differential amplifier 10. It is designed such that the sum of delay t1 occurring at filtering at synchronous excitation signal generating circuit 8 and delay t2 at resolver 2 renders the amount of delay of cosine and sine signals S3 and S4 from the clock signal S1 to be approximately ¼ of the PWM period. Such arrangement is made so that the later detailed A/D conversion timing conforms with the maximum amplitude timing of cosine and sine signals S3 and S4.

Figure 3:
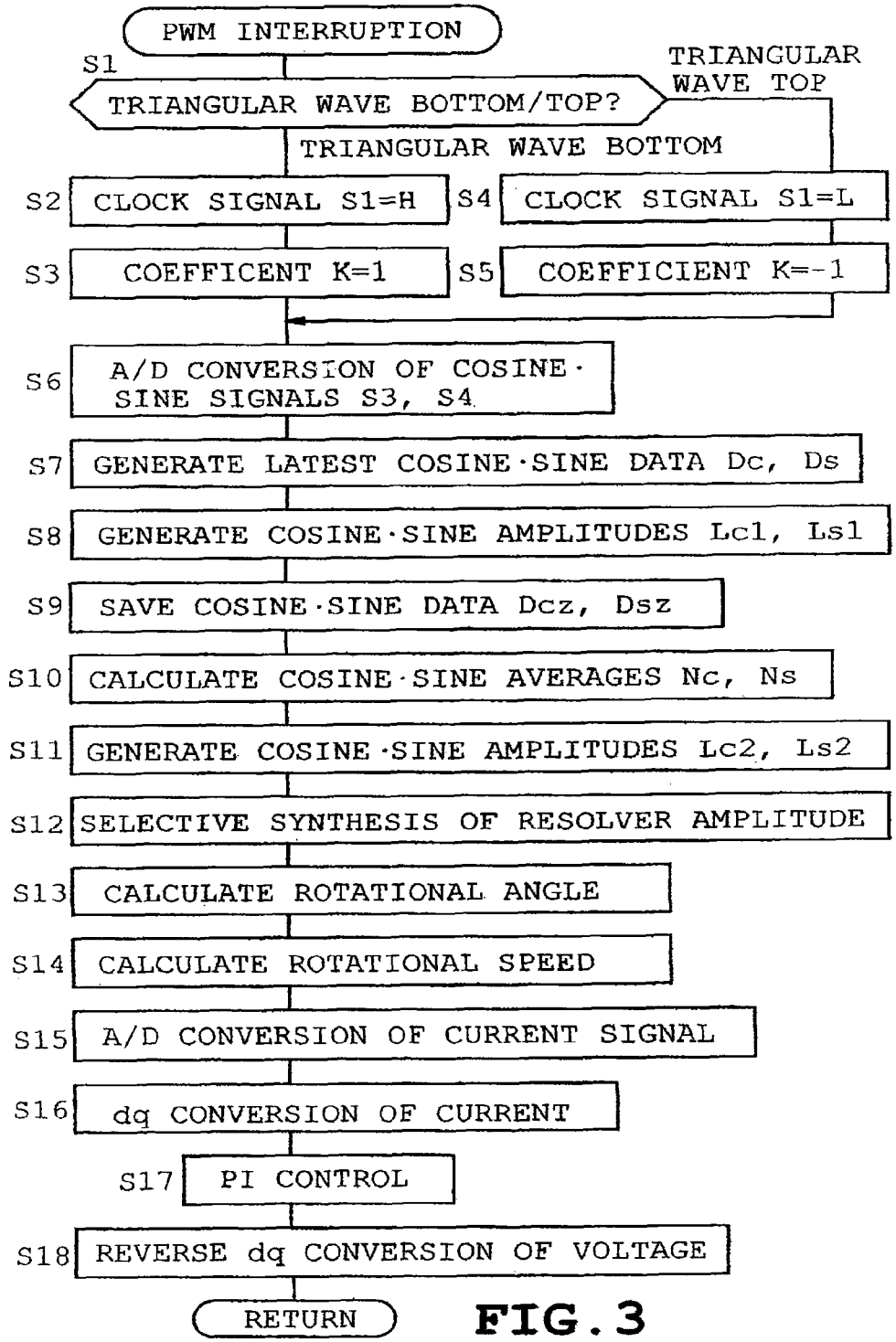
FIG. 3 is a flowchart of a PWM interruption.

FIG. 3 is a flowchart describing the process flow of a PWM interruption executed in synchronization with the PWM period by the CPU of microcomputer 22. The PWM interruption occurs at the bottom and the top of the triangular wave of the PWM carrier wave. At step S1, a determination is made whether the PWM interruption has occurred at the bottom or top of the triangular wave. In case of a bottom interruption, at step S2, the pulse level of clock signal S1 is set at level H, and at step 3, coefficient K is set at 1. On the other hand, in case of a top interruption, at step S4, the pulse level of clock signal S1 is set at level L, and at step 5, coefficient K is set at −1. The coefficient K will be used in later described steps S8 and S11.

Then, at step S6, the CPU performs A/D conversion of cosine and sine signals S3 and S4 at A/D converter 12$b$ in order to generate the latest cosine data Dc and sine data Ds at step S7 by the latest data generator 24. Further, at step S8, a first amplitude calculation process is executed at amplitude detector 27 by utilizing the previous cosine and sine data Dcz and Dsz saved at previous data retainer 26 at step S9 of the previous PWM interruption and the latest cosine data Dc and sine data Ds in order to calculate the cosine and sine amplitudes Lc1 and Ls1 according to the following equations (1) and (2).

$$\text{cosine amplitude } Lc1=(Dc-Dcz) \cdot K \qquad (1)$$

$$\text{sine amplitude } Ls1=(Ds-Dsz) \cdot K \qquad (2)$$

Then, at step S9, cosine and sine data Dc and Ds are saved at the previous data retainer 26 as cosine and sine data Dcz and Dsz.

$$Dcz=Dc \qquad (3)$$

$$Dsz=Ds \qquad (4)$$

Steps S8 and S9 described above constitute the first amplitude calculator 25 (first amplitude calculation step).

Figure 5:
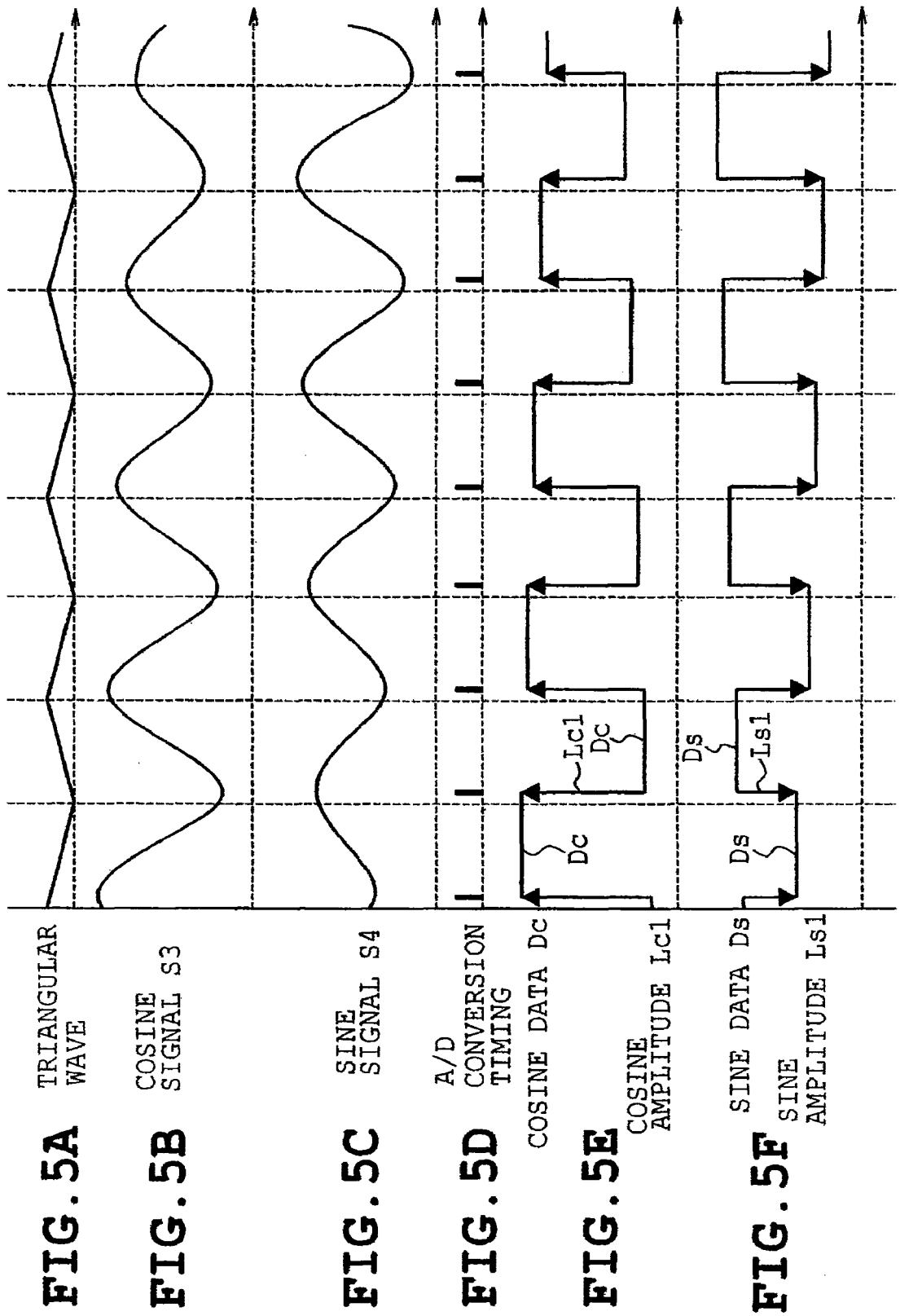
FIG. 5A to 5F shows waveforms of a first amplitude calculation process.

FIG. 5 indicates the waveforms involved in the first amplitude calculation process. The latest cosine data Dc is generated from cosine signal S3 at each A/D conversion timing and cosine amplitude Lc1 indicated by the arrow is obtained from the difference between the latest cosine data Dc and the previous cosine data Dcz. Similarly, the latest sine data Ds is generated from sine signal S4 at each A/D conversion timing and sine amplitude Ls1 indicated by the arrow is obtained from the difference between the latest sine data Ds and the previous sine data Dsz At step S10 of the flowchart shown in FIG. 3, cosine average Nc and sine average Ns representing the midpoint data of cosine and sine data Dc and Ds are calculated at average calculator 29 by the following equations (5) and (6). Constant X is set at 10,000, for example. When constant X is too small, the average will vary depending on whether the current interruption has occurred at the bottom or the top of the triangular wave. On the other hand, when constant X is too large, delay will occur in calculating the average.

$$\text{cosine average } Nc=((X-1)Nc+Dc)/X \qquad (5)$$

$$\text{sine average } Ns=((X-1)Ns+Ds)/X \qquad (6)$$

Then, at step S11, cosine and sine amplitudes Lc2 and Ls2 are calculated by the following equations (7) and (8) by utilizing cosine and sine averages Nc and Ns and cosine and sine data Dc and Ds as the second amplitude calculation process executed at amplitude detector 30.

$$\text{cosine amplitude } Lc2=(Dc-Nc) \cdot 2K \qquad (7)$$

$$\text{sine amplitude } Ls2=(Ds-Ns) \cdot 2K \qquad (8)$$

Steps S10 and S11 described above constitute the second amplitude calculator 28 (second amplitude calculation step).

Figure 6:
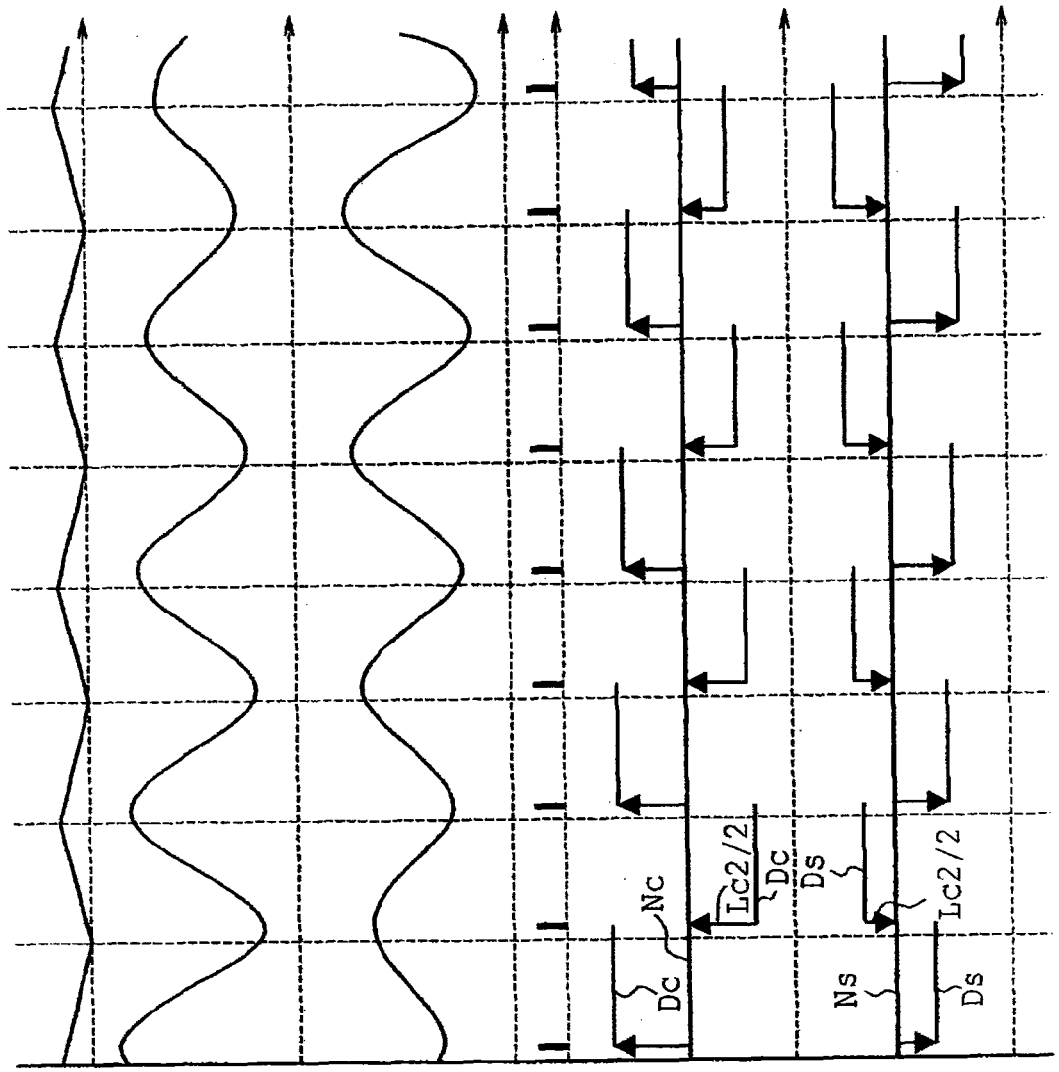
FIG. 6A to 6F shows waveforms of a second amplitude calculation process.

FIG. 6 indicates the waveforms involved in the second amplitude calculation process. At each A/D conversion timing, the latest cosine data Dc is generated from cosine signal S3, whereby the cosine average Nc is calculated. Then, cosine amplitude Lc2 indicated by the arrow is obtained from the difference between the latest cosine data Dc and the cosine average Nc. The length of arrow indicated at FIG. 6 corresponds to ½ of the cosine amplitude Lc2. Similarly, at each A/D conversion timing, the latest sine data Ds is generated from sine signal S4, whereby the sine average Ns is calculated. Then, sine amplitude Ls2 indicated by the arrow is obtained from the difference between the latest sine data Ds and the sine average Ns. The length of arrow indicated at FIG. 6 corresponds to ½ of the sine amplitude Ls2.

At step S12 of the flowchart shown in FIG. 3, a selective synthesis is performed at a synthesizer 31 based on cosine and sine amplitudes Lc1 and Ls1, cosine and sine amplitudes Lc2 and Ls2, and synthesis coefficients P1 and P2, to calculate cosine and sine amplitudes Lc and Ls by the following equations (9) and (10).

$$\text{cosine amplitude } Lc=P1 \cdot Lc1+P2 \cdot Lc2 \qquad (9)$$

$$\text{sine amplitude } Ls=P1 \cdot Ls1+P2 \cdot Ls2 \qquad (10)$$

Then, in the subsequent step S13, rotational angle calculation process is executed at rotational angle calculator 32 to calculate rotational angle θ in eight different patterns distinguished by relation in amount between cosine and sine amplitudes Lc and Ls.

Pattern 1
  When $Lc \geq 0$ and $Ls \geq 0$ and $|Lc| \geq |Ls|$ $$\text{rotational angle } \theta = \arctan(Ls/Lc) \qquad (11)$$

Pattern 2
  When $Lc \geq 0$ and $Ls \geq 0$ and $|Ls| \geq |Lc|$ $$\text{rotational angle } \theta = \pi/2 - \arctan(Lc/Ls) \qquad (12)$$

Pattern 3
  When $Lc < 0$ and $Ls \geq 0$ and $|Ls| \geq |Lc|$ $$\text{rotational angle } \theta = \pi/2 + \arctan(Lc/Ls) \qquad (13)$$

Pattern 4
  When $Lc < 0$ and $Ls \geq 0$ and $|Lc| \geq |Ls|$ $$\text{rotational angle } \theta = \pi - \arctan(Ls/Lc) \qquad (14)$$

Pattern 5
When $Lc<0$ and $Ls<0$ and $|Lc| \geqq |Ls|$ $$\text{rotational angle } \theta = \pi + \arctan(Ls/Lc) \quad (15)$$

Pattern 6
When $Lc<0$ and $Ls<0$ and $|Ls| \geqq |Lc|$ $$\text{rotational angle } \theta = -\pi/2 - \arctan(Lc/Ls) \quad (16)$$

Pattern 7
When $Lc \geqq 0$ and $Ls<0$ and $|Ls| \geqq |Lc|$ $$\text{rotational angle } \theta = -\pi/2 + \arctan(Lc/Ls) \quad (17)$$

Pattern 8
When $Lc \geqq 0$ and $Ls<0$ and $|Lc| \geqq |Ls|$ $$\text{rotational angle } \theta = -\arctan(Ls/Lc) \quad (18)$$

The purpose of the distinction into 8 patterns is to perform calculation by using the range of 0 to $\pi/4$ because function arctan provides poor calculation accuracy in the proximity of $\pi/2$.

At step 14, rotational speed $\omega$ calculated at a rotational speed calculator 33 by equation (19). The $\theta z$ represents result of previous calculation of rotational angle, whereas T represents rotational angle calculation period.

$$\text{Rotational speed } \omega = (\theta - \theta z)/T \quad (19)$$

Figure 7:
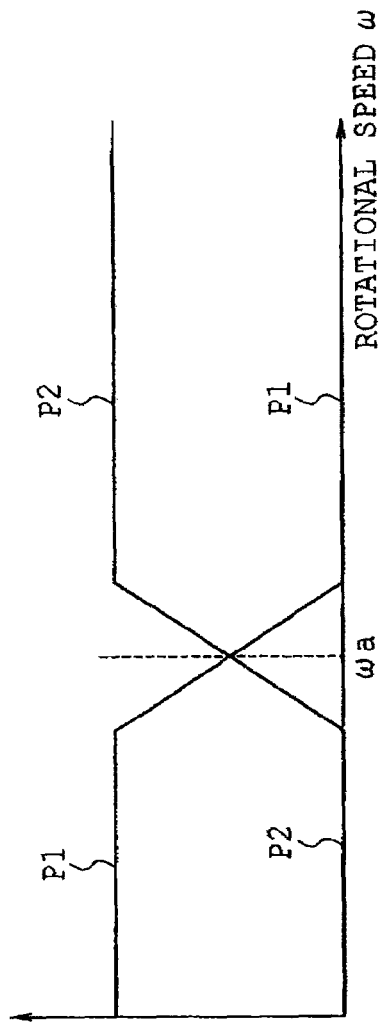
FIG. 7 shows relation of synthesis coefficients P1 and P2 to rotational speed ω.
Figure 8:
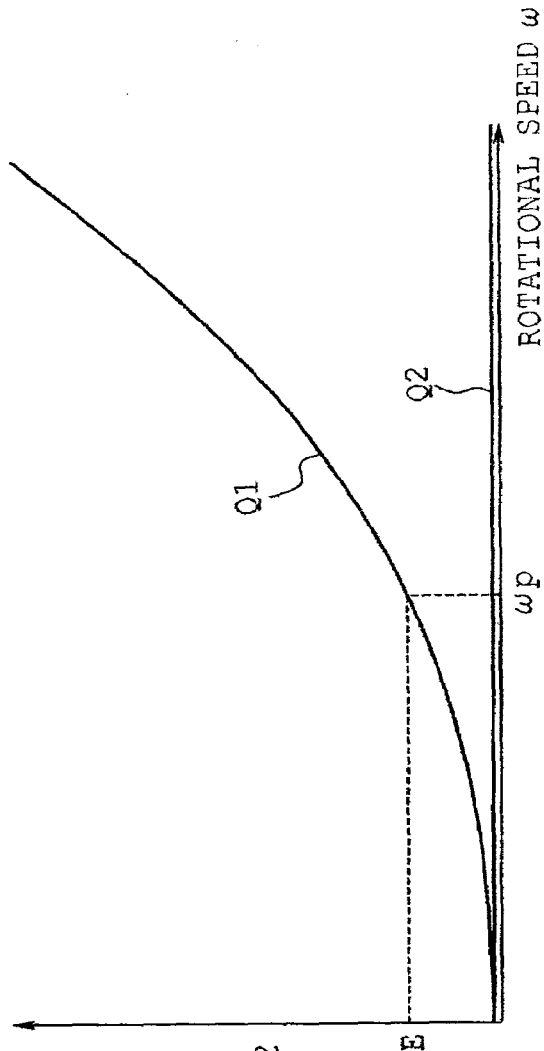
FIG. 8 shows calculation errors Q1 and Q2 of rotational angle θ.

Next, operation of the synthesis coefficient P1 and P2 during synthesis of resolver amplitude at step S12 will be described with reference to FIGS. 7 and 8. A first synthesis coefficient P1 and second synthesis coefficient P2 each ranging from 0 to 1, maintaining a relation of P1+P2=1, are determined based on rotational speed $\omega$ as shown in FIG. 7. FIG. 8 indicates calculation error Q1 of rotational angle $\theta$ when using cosine and sine amplitudes Lc1 and Ls1 outputted from the first amplitude calculator 25, and calculation error Q2 of rotational angle when using cosine and sine amplitudes Lc2 and Ls2 outputted from the second amplitude calculator 28.

At the first amplitude calculator 25, the previous cosine and sine data Dcz and Dsz, the current cosine and sine data Dc and Ds are used for calculation of cosine and sine amplitudes Lc1 and Ls1. Thus, calculation error Q1 is described by the following equation (20) relative to rotational angle calculation period T and rotational speed $\omega$. Rotational angle calculation period T of the present embodiment conforms to the period of interruption, the period of interruption being ½ of the PWM period. In the example shown in FIG. 8, the calculation error Q1 at rotational speed $\omega p$ reaches the acceptable value.

$$Q1 \propto (T/2) \cdot \omega \quad (20)$$

On the other hand, the second amplitude calculator 28 calculates cosine and sine amplitudes Lc2 and Ls2 based on differences between averages Nc, Ns and the latest data Dc, Ds, respectively. Thus, calculation error Q2 is substantially at zero during the short time span unaffected by temperature variation, whereas during the long time span from start of controller 21 operation until generation of averages Nc and Ns, the calculation error Q2 increases, which is an indication of lower reliability in rotational angle $\theta$.

Thus, the synthesizer 31, when immediately after operation start and during low-speed rotation, selects cosine and sine amplitudes Lc1 and Ls1 calculated by the first amplitude calculator 25. On the other hand, during high-speed rotation in which errors of cosine and sine amplitudes Lc1 and Ls1 are increased, the synthesizer 31 selects cosine and sine amplitudes Lc2 and Ls2 calculated by the second amplitude calculator 28 A selective rotational speed $\omega a$ on which the determination of selective switch is based, is set so that calculation error of rotational speed $\theta$ in case synthesized cosine and sine amplitudes Lc and Ls are used is set at or less than the acceptable value of detection. Further, to prevent discontinuity of rotational angle $\theta$ at selective switching, synthesis coefficients P1 and P2 are gradually changed (changed proportionately in FIG. 7) relative to rotational speed $\omega$ within the suitable speed range centered on selective rotational speed $\omega a$.

Further, in case it is required to change the PWM frequency during rotation of the motor 1, the synthesis coefficients P1 and P2 may be determined based on ratio $T/T\omega$ of rotational angle calculation period T (½ of the PWM period in the present exemplary embodiment) and rotational period $T\omega$ (=1/rotational speed $\omega$). That is, when $T/T\omega$ is less than a predetermined value, the synthesizer 31 selects cosine and sine amplitudes Lc1 and Ls1 calculated by the first amplitude calculator 25, whereas cosine and sine amplitudes Lc2 and Ls2 calculated by the second amplitude calculator 28 are selected when $T/T\omega$ is equal to or greater than the predetermined value. Thus, the patterns set for synthesis coefficients P1 and P2 shown in FIG. 7 are generally shifted towards lower rotational speed (left) when PWM frequency is reduced (rotational angle calculation period T is increased), and is generally shifted toward higher rotational speed (right) when PWM frequency is increased (rotational angle calculation period T is reduced). As described above, synthesis coefficients P1 and P2 are determined based on rotational speed $\omega$ and rotational calculation period T.

As shown in the flowchart of FIG. 3, at step S15, the detection signal outputted from current detecting circuit 7 is inputted into microcomputer 22 via A/D converter 12a. Microcomputer 22, thus senses current Iu, Iv, and Iw at windings lu, lv and lw. Controller 34 performs PWM control of current by field-oriented control at steps S15, S16, S17, and S18. At step 16, the controller 34 converts currents Iu, Iv, and Iw into currents Id and Iq of d-axis and q-axis respectively based on the detected rotational angle $\theta$.

At step 17, the controller 34 performs PT (Proportional-Integral) control based on current differences $\Delta$Id, $\Delta$Iq between converted currents Id, Iq and command current Idr (excitation current), Idq (torque current), to obtain command voltages Vd, Vq. At step 18, controller 34 converts command voltages Vd and Vq into each phase voltage Vu, Vv, and Vw to be applied to motor 1 based on detected rotational angle $\theta$, and sets the converted voltages Vu, Vv, and Vw to PWM circuit 11. Current control as described above is executed that performs PWM control by determining the voltage by comparative calculation of detected current and command current.

As described above, controller 21 of the present exemplary embodiment is provided with the first amplitude calculator 25 and the second amplitude calculator 28 having different error characteristics. The first amplitude calculator 25 obtains cosine and sine amplitudes Lc1 and Ls1 based on cosine and sine data Dc and Ds corresponding to the resultant values after two consecutive A/D conversions. Since cosine and sine amplitudes Lc1 and Ls1 are selected by microcomputer 22 immediately after operation start and during low-speed rotation, accurate rotational angle $\theta$ can be obtained without being affected by drifts occurring at resolver 2 and controller 21. In other words, the result obtained at the first amplitude calculator 25 is not affected by factors such as temperature drifts at operation start of controller 21, and by temperature drift occurring at resolver 2 when significant temperature variation occurs at rotation start of motor 1.

The second amplitude calculator 28 obtains cosine and sine averages Nc and Ns based on past A/D converted values. Then, cosine and sine amplitudes Lc2 and Ls2 are obtained based on the difference between the averages Nc and Ns and the latest data Dc and Ds, respectively. The cosine and sine amplitudes Lc2 and Ls2 are selected by microcomputer 22 during tentative high-speed rotation such as vehicle acceleration and high-speed operation. Thus, accurate rotational angle θ can be obtained which is not affected by the error depending on rotational angle calculation period T.

As described above, by selectively synthesizing amplitudes Lc1, Ls1 and Lc2, Ls2 outputted from the two amplitude calculators 25 and 28, errors occurring from both drift and rotational angle calculation period T can be reduced. As a result, accurate rotational angle θ can be obtained throughout the full rotational range in which motor 1 is driven to allow control of motor 1 at high efficiency. Further, such configuration allows highly-responsive and highly-reliable motor control system at low cost without use of dedicated resolver/digital conversion IC.

Figure 9:
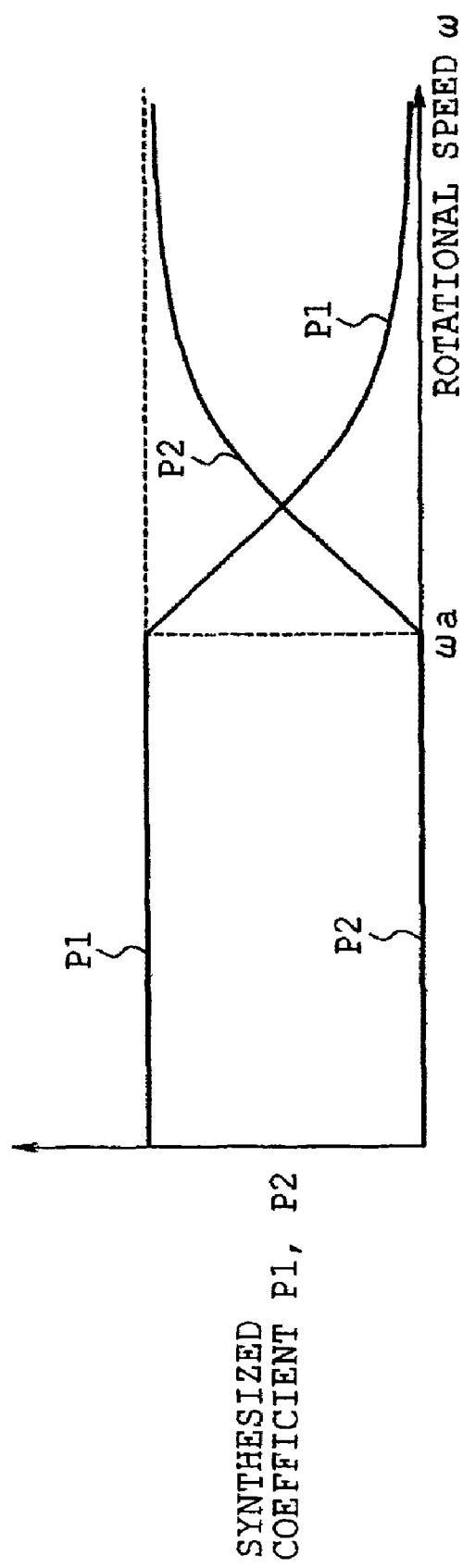
FIG. 9 corresponds to FIG. 7 and describes a second exemplary embodiment of the present disclosure.

A second exemplary embodiment will be described hereinafter with reference to FIG. 9 which corresponds to FIG. 7.

As was the case in the first exemplary embodiment, synthesizer 31 selects cosine and sine amplitudes Lc1 and Ls1 during low-speed rotation. Synthesis coefficients P1 and P2 are set so that calculation error of rotational angle θ resulting from synthesized cosine and sine amplitudes Lc and Ls used is equalized with the acceptable value where the speed range is equal to or greater than selective rotational speed ωp. As a result, synthesis coefficient P1 stays at "1" when rotational speed ω is less than selective rotational speed ωp, and is gradually reduced when rotational speed ω is equal to or greater than selective rotational speed ωp. Further, synthesis coefficient P2 stays at "0" when rotational speed ω is less than selective rotational speed ωp, and is gradually increased when rotational speed ω is equal to or greater than selective rotational speed ωp.

According to the present exemplary embodiment, cosine and sine amplitudes Lc1 and Ls1 are selected for synthesis when rotational speed is equal to or greater than selective rotational speed ωp so that calculation error of rotational angle θ equals to the acceptable value. Thus, when rotational speed ω is equal to or greater than selective rotational speed ωp, low drift effect can be obtained depending on the size of synthesis coefficient P1.

The present disclosure is not limited to the above described and illustrated exemplary embodiments in the accompanying drawings but may be modified or expanded as follows.

In the above described exemplary embodiments, rotational angle calculation period T is ½ of the PWM period, however it may be n multiple (n is a positive integer) of the PWM period.

Clock signal S1 need not be in the same period as the triangular wave serving as carrier wave as long as it is synchronized with the PWM period. For instance, the clock signal S1 may have a period which is n multiple (n is a positive integer) of the PWM period and the period of A/D conversion of cosine and signals S3 and S4 may be n/2 multiple of the PWM period. Also, when clock signal S1 is based on the current control period and made to assume a period which is n multiple (n is a positive integer) of the current control period, A/D conversion period may be arranged at n/2 of the current control period.

Method of selective synthesis at synthesizer 31 is not limited to the above described method, but may be modified so that the result of the first amplitude calculation is forcibly selected during a predetermined period immediately after resetting of microcomputer 22.

The first amplitude calculator 25 may calculate cosine and sine amplitudes Lc1 and Ls1 based on cosine and sine data Dc and Ds corresponding to two A/D converted values that are non-consecutive, for instance, the currently converted value and the converted value of two iterations before.

The calculation employing function arctan need not be distinguished into 8 different patterns if high-accuracy is not required in the calculation.

The present disclosure may be employed to a power generator or motors other than brush-less DC motors.

The foregoing description and drawings are merely illustrative of the principles of the present disclosure and are not to be construed in a limited sense. Various changes and modifications will become apparent to those of ordinary skill in the art. All such changes and modifications are seen to fall within the scope of the disclosure as defined by the appended claims.

What is claimed is:

1. A controller for a motor provided with a resolver that outputs a cosine signal and a sine signal, the controller comprising:
    a reference signal generator that generates a reference excitation signal synchronized with a PWM (Pulse Width Modulation) period and that provides the reference excitation signal to the resolver;
    an A/D converter that performs A/D conversion of the cosine signal and the sine signal outputted from the resolver, the A/D conversion being synchronized with the PWM period;
    a first amplitude calculator that calculates an amplitude of the cosine signal of the resolver based on a twice-A/D converted cosine signal and that calculates an amplitude of the sine signal of the resolver based on a twice-A/D converted sine signal;
    a second amplitude calculator that calculates averages of the cosine signal and the sine signal of the resolver based on their past A/D converted values, and that calculates the amplitude of the cosine signal of the resolver from a difference between the cosine signal average and a latest A/D converted cosine signal, and that calculates the amplitude of the sine signal of the resolver from a difference between the sine signal average and a latest A/D converted sine signal;
    a synthesizer that synthesizes the cosine and sine signal amplitudes of the resolver obtained by the first amplitude calculator and the cosine and sine signal amplitudes of the resolver obtained by the second amplitude calculator;
    a rotational angle calculator that calculates a rotational angle of the motor based on the synthesized cosine and sine signal amplitudes of the resolver outputted by the synthesizer;
    a PWM controller that performs PWM control of motor winding current based on the rotational angle calculated by the rotational angle calculator.

2. The controller of claim 1, wherein the synthesizer synthesizes the cosine and sine signal amplitudes of the resolver obtained by the first and the second amplitude calculators by a synthesis ratio based on a motor rotational speed.

3. The controller of claim 2, wherein the synthesizer further synthesizes the cosine and sine signal amplitudes of the resolver obtained by the first and the second amplitude calculators by a synthesis ratio based on a reference excitation signal period.

4. The controller of claim 2, wherein the synthesizer, when the rotational speed is within a predetermined range centering on a selective rotational speed, gradually reduces the synthesis ratio of the cosine and the sine signal amplitudes obtained by the first amplitude calculator and gradually increases the synthesis ratio of the cosine and the sine signal amplitudes obtained by the second amplitude calculator as the rotational speed increases, whereas when the rotational speed is lower than the predetermined range, the synthesis ratio of the cosine and the sine signal amplitudes obtained by the first amplitude calculator is set at 1, and when the rotational speed is greater than the predetermined range, the synthesis ratio of the cosine and the sine signal amplitudes obtained by the second amplitude calculator is set at 1.

5. The controller of claim 4, wherein the selective rotational speed is set so that an error of the rotational angle of the motor calculated by the rotational angle calculator is equal to or less than an acceptable value at all rotational speeds that causes rotation of the motor.

6. The controller of claim 2, wherein the synthesizer, when the rotational speed is lower than a selective rotational speed, sets a synthesis ratio of the cosine and sine signal amplitude obtained by the first amplitude calculator at 1, whereas when the rotational speed is equal to or greater than the selective rotational speed, the synthesis ratio of the cosine and the sine signal amplitudes obtained by the first amplitude calculator is gradually reduced and the synthesis ratio of the cosine and sine signal amplitudes obtained by the second amplitude calculator is gradually increased as the rotational speed increases.

7. The controller of claim 6, wherein the synthesis ratio, when the rotational speed is equal to or greater than the selective rotational speed, is set so that an error of the rotational angle of the motor calculated by the rotational angle calculator is equal to an acceptable value.

8. The controller of claim 1, wherein the synthesizer, during low-speed rotation, selects the cosine and sine signal amplitudes of the resolver obtained from the first amplitude calculator, whereas during high-speed rotation, selects the cosine and sine signal amplitudes of the resolver obtained from the second amplitude calculator.

9. A motor control system, comprising:
a motor;
a resolver provided in the motor and outputting a cosine signal and a sine signal;
a controller that executes PWM control of the motor by detecting a rotational angle of the motor based on the cosine signal and the sine signal outputted from the resolver, the controller including a reference signal generator that generates a reference excitation signal synchronized with a PWM (Pulse Width Modulation) period and that provides the reference excitation signal to the resolver; an A/D converter that performs A/D conversion of the cosine signal and the sine signal outputted from the resolver, the A/D conversion being synchronized with the PWM period; a first amplitude calculator that calculates an amplitude of the cosine signal of the resolver based on a twice-A/D converted cosine signal and that calculates an amplitude of the sine signal of the resolver based on a twice-A/D converted sine signal; a second amplitude calculator that calculates averages of the cosine signal and the sine signal of the resolver based on their past A/D converted values, and that calculates the amplitude of the cosine signal of the resolver from a difference between the cosine signal average and a latest A/C converted cosine signal, and that calculates the amplitude of the sine signal of the resolver from a difference between the sine signal average and a latest A/D converted sine signal; a synthesizer that synthesizes the cosine and sine signal amplitudes of the resolver obtained by the first amplitude calculator and the cosine and sine signal amplitudes of the resolver obtained by the second amplitude calculator; a rotational angle calculator that calculates a rotational angle of the motor based on the synthesized cosine and sine signal amplitudes of the resolver outputted by the synthesizer; a PWM controller that performs PWM control of motor winding current based on the rotational angle calculated by the rotational angle calculator.

10. A method of controlling a motor, comprising:
an A/D conversion step of performing A/D conversion of a cosine and a sine signal produced by a resolver of the motor, the cosine and the sine signal being produced based on an excitation reference signal that is synchronized with a PWM period and that is supplied to the resolver;
a first amplitude calculation step of calculating an amplitude of the cosine signal of the resolver based on a twice-A/D converted cosine signal and that calculates an amplitude of the sine signal of the resolver based on a twice-A/D converted sine signal;
a second amplitude calculation step of calculating averages of the cosine signal and the sine signal of the resolver based on their past A/D converted values, and that calculates the amplitude of the cosine signal of the resolver from a difference between the cosine signal average and a latest A/D converted cosine signal, and that calculates the amplitude of the sine signal of the resolver from a difference between the sine signal average and a latest A/D converted of the sine signal;
a synthesizing step of synthesizing the cosine and sine signal amplitudes of the resolver obtained by the first amplitude calculation step and the cosine and sine signal amplitudes of the resolver obtained by the second amplitude calculation step;
a rotational angle calculation step of calculating a rotational angle of the motor based on the synthesized cosine and sine signal amplitudes of the resolver obtained by the synthesizing step; and
a PWM controlling step of performing PWM control of motor winding current based on the rotational angle calculated by the rotational angle calculation step.

* * * * *